United States Patent [19]

Patil

[11] Patent Number: 5,639,718
[45] Date of Patent: *Jun. 17, 1997

[54] MULTIFUNCTIONAL VISCOSITY MODIFIERS FOR LUBRICATING OIL COMPOSITIONS WITH IMPROVED DISPERSANCY AND ANTIOXIDANCY DERIVED FROM ADDUCTS OF QUINONE

[75] Inventor: Abhimanyu O. Patil, Westfield, N.J.

[73] Assignee: Exxon Chemical Patents Inc., Linden, N.J.

[*] Notice: The term of this patent shall not extend beyond the expiration date of Pat. No. 5,399,277.

[21] Appl. No.: 344,432

[22] Filed: Nov. 23, 1994

[51] Int. Cl.$^6$ .................................................. C10M 149/16
[52] U.S. Cl. ..................... 508/454; 564/395; 564/403; 552/296; 552/297; 44/421; 44/426; 44/427; 44/428; 508/543
[58] Field of Search ................. 252/51.5 R; 44/421, 44/426, 427, 428; 564/395, 403; 552/297, 296; 508/454, 543

[56] References Cited

U.S. PATENT DOCUMENTS

| | | | |
|---|---|---|---|
| 3,682,980 | 8/1972 | Braid et al. | 552/297 |
| 4,248,725 | 2/1981 | Crawford et al. | 252/51.5 A |
| 4,292,047 | 9/1981 | Vartanian et al. | 44/421 |
| 4,505,834 | 3/1985 | Papay et al. | 252/51.5 A |
| 4,517,104 | 5/1985 | Bloch et al. | 252/51.5 A |
| 4,659,763 | 4/1987 | Galluci et al. | 524/358 |
| 4,749,504 | 6/1988 | Aihara et al. | 252/49.5 |
| 4,803,003 | 2/1989 | Chung | 252/51.5 A |
| 4,831,107 | 5/1989 | Erhan | 528/229 |
| 4,857,217 | 8/1989 | Gutierrez et al. | 252/47 |
| 4,863,623 | 9/1989 | Nalesnik | 252/50 |
| 4,882,413 | 11/1989 | Erhan | 528/229 |
| 4,956,107 | 9/1990 | Guiterrez et al. | 252/47 |
| 4,963,275 | 10/1990 | Gutierrez et al. | 252/47 |
| 5,017,299 | 5/1991 | Gutierrez et al. | 252/51.5 |
| 5,030,370 | 7/1991 | Patil et al. | 252/50 |
| 5,071,919 | 12/1991 | DeGonia et al. | 525/285 |
| 5,182,041 | 1/1993 | Benfarmeo et al. | 252/51.5 A |
| 5,211,865 | 5/1993 | Patil et al. | 252/56 D |
| 5,271,856 | 12/1993 | Patil et al. | 252/50 |
| 5,399,277 | 3/1995 | Patil | 252/51.5 R |

FOREIGN PATENT DOCUMENTS

| | | | |
|---|---|---|---|
| 0440506A3 | 8/1991 | European Pat. Off. | C10M 129/92 |
| 963263 | 7/1964 | United Kingdom . | |
| 2055852 | 3/1981 | United Kingdom | C08F 8/32 |
| 93/20133 | 10/1993 | WIPO . | |

OTHER PUBLICATIONS

Derwent Publications Ltd., AN 85-280222, JP 60 190 434 (Kanegafuchi Chem), Sep. 1985.

Kirk Othmer Encylcopedia of Chemical Technology, vol. 19, 3d Ed., (Wiley-Interscience, NY 1982) pp. 598-606 date unavailable.

"Novel Water-Displacing Polymers Show Promise in Coating Uses" R. Dagani, Chem. & Engrg. News, vol. 69, Jul. 29, 1991, pp. 20-22.

World Patent Abstracts No. 93-006854/01, 1993 (SU 764331-A1) month unavailable.

World Patent Abstracts No. 93-006924/01, 1993 (SU 1067805-A1) month unavailable.

World Patent Abstracts No. 66349X/35, 1976 (SU 448-831) month unavailable.

(List continued on next page.)

Primary Examiner—Jacqueline V. Howard
Attorney, Agent, or Firm—Harvey L. Cohen

[57] ABSTRACT

An oil-soluble lubricating oil and fuel additive, useful as a multifunctional viscosity modifier comprising succinimide and other amine-containing polymers reacted with a quinone or substituted quinone adducts. Suitable polymers are those containing primary or secondary amine groups such as EPSA-PAM and EPDM-amine polymers. The multifunctional viscosity modifier additive provides improved dispersancy and antioxidancy to a lubricating oil or fuel composition.

12 Claims, 1 Drawing Sheet

OTHER PUBLICATIONS

World Patent Abstracts No. 93–006861/01, 1993 (SU 780475–A1) month unavailable.

World Patent Abstracts No. 88–358532/50, 1988 (J6 3270–648–A) month unavailable.

"Redox Polymers Based on Polyamines" E.E. Ergozhin, et al., Reactive Polymers, vol. 16, 1991/1992, pp. 321–324 month unavailable.

E.E. Ergozhin et al., Vysokomal, Soedin, Series B. vol. 30, pp. 20–23 (Chemical Abstracts No. 108(16):132693m, 1988) month unavailable.

E.E. Ergozhin et al., Khim, Khim, Tekhnol, vol. 33(3) pp. 123–25, 1990 (Chemical Abstracts No. 113(22):192458b, 1990) month unavailable.

"Quinone–Amine Polymers, V. Syntheses and Solubilities of Several Diamine–p–Benzoquinone Oligomers" V.S. Nithianandam et al., J. Applied Polymer Science, vol. 42, 2893–2897 (1991) month unavailable.

Chemical Abstracts No. 92:131719 "Aminobenzoquinones as inhibitors of the high–temperature oxidation of synthetic oils" Neftekhimiya (1979), 19(6), 902–7 month unavailable.

Fig-1

MULTIFUNCTIONAL VISCOSITY MODIFIERS FOR LUBRICATING OIL COMPOSITIONS WITH IMPROVED DISPERSANCY AND ANTIOXIDANCY DERIVED FROM ADDUCTS OF QUINONE

FIELD OF THE INVENTION

The present invention relates to multifunctional viscosity modifiers derived from adducts of quinone or substituted quinone, and succinimide and other amine-containing polymers. These multifunctional viscosity modifier additives for lubricating oil compositions and fuel compositions provide improved dispersancy and antioxidancy.

RELATED APPLICATIONS

U.S. Ser. No. 344,775, filed herewith, entitled "Adducts Of Quinone Compounds And Amine-Containing Polymers For Use In Lubricating Oils And In Fuels" (Docket No. PT-1161) discloses adducts of quinone compounds and amine-containing polymers useful as dispersants, antioxidants and ami-corrosion additives for lubricating oil compositions.

U.S. Pat. No. 5,399,277, discloses fuel and lubricant additives prepared by alkylating dihydroxy-aromatic compounds such as hydroquinone and catechol and then aminating.

BACKGROUND OF THE INVENTION

Amine-containing polymers are well known for their use as multi functional lubricant additives; e.g., lubricant dispersant-viscosity modifiers. It has been surprisingly found that quinones may be used to modify the properties of the polymers and in so doing modify the lubricant performance of the polymefic additives. Multifunctional viscosity modifiers (MFVM's) or as they are alternatively identified multifunctional viscosity index improvers (MFVI's) are commercially important lubricant additives.

It has been surprisingly found that reacting MFVM's (containing reactive 1° or 2° nitrogens (i.e. amino groups)) with quinones such as benzoquinone, substituted quinones or naphthoquinone, yields products with improved dispersancy and antioxidancy (e.g., thermooxidative stability).

It is known to use polymer additives which are capable of providing more than one function. Thus, for example, U.S. Pat. No. 4,863,623 discloses a multifunctional lubricant additive which is a VI improver, a dispersant, and an antioxidant when employed in a lubricating oil composition. The additive is a reaction product comprising an ethylene copolymer or terpolymer (molecular weight of 5,000–500,000) of a $C_3$–$C_{10}$ alpha-monoolefin and optionally a nonconjugated diene or triene (e.g., EPDM) on which has been grafted an ethylenically unsaturated carboxylic functional group (e.g., maleic arthydride) which is then further derivatized with an amino-aromatic polyamine compound selected from certain N-arylphenylenediamines, aminothiazoles, aminocarbazoles, aminoindoles, aminopyrroles and others.

U.S. Pat. No. 5,182,041 discloses the reaction product of a polyolefin (molecular weight of 300–3,500) of a $C_2$–$C_{10}$ alpha-monoolefin and optionally a non-conjugated diene or triene which has been acylated with an ethylenically unsaturated carboxylic functional group and further derivatized with an amino-aromatic polyamine like those disclosed in the '623 patent of the preceding paragraph. The reaction product is disclosed to impart dispersancy and antioxidant properties to lubricating oil compositions.

U.S. Pat. No. 4,248,725 discloses additives having both dispersant and antioxidant activity in lubricating oil compositions. The additives are produced by reacting a dispersant having free >N-H groups (e.g., a substitute succinimide) with an aldehyde and a compound having antioxidant activity and capable of condensing with the >N-H groups in the dispersant and the aldehyde. Mononuclear and polynuclear substituted phenols and secondary aromatic amines are disclosed to be suitable antioxidants.

U.S. Pat. No. 4,517,104 discloses oil soluble viscosity index improving ethylene copolymers, such as copolymers of ethylene and propylene, reacted or grafted in a mineral oil solvent with unsaturated carboxylic acid moleties such as maleic arthydride, thermally or in the presence preferably of a peroxide initiator, and reacted with polyamines having two or more primary amine groups and an alkenyl succinic anhydride. These reactions permit the incorporation of varnish inhibition and dispersancy into the ethylene copolymer while inhibiting cross-linking with resulting viscosity increase, haze or gelling.

U.S. Pat. No. 5,427,702 discloses multifunctional viscosity modifiers comprising a mixture ofderivatized ethylene-alpha-olefin copolymers, A and B. Copolymer A comprises from about 30 to about 60 wt. % monomer units derived from ethylene and copolymer B comprises from about 60 to about 80 wt. % units derived from ethylene. The respective weight percent of ethylene derived monomer units present in copolymers A and B differs by at least 5 wt. %.

U.S. Pat. No. 5,424,367 discloses multiple sequential chemical reactions on a polymeric feedstock carded out in an extruder with multiple reaction zones. Each reaction zone has means for introduction of reagents, for mixing of reagents with polymer and for removal of by/co-products or unreacted reagents.

U.S. Pat. No. 5,030,370 discloses compositions of lubricating oil and amino-substituted polymers (e.g. ethylene alpha-olefin interpolymers substituted by primary amino or secondary amino groups). Preferred amino-substituted interpolymers comprise amino-substituted ethylene propylene norbornene terpolymers. The polymers are disclosed to be oil soluble and useful as viscosity index improver dispersants.

U.S. Pat. No. 5,211,865 discloses lubricating oil compositions exhibiting improved antioxidant properties containing a viscosity index improver-dispersant comprising the reaction products of an ethylene copolymer having a molecular weight of from 5,000–500,000 grafted with ethylenically unsaturated carboxylic acid material, a polyamine having at least two primary amino groups, an aldehyde, a heterocyclic nitrogen reactant having at least an —N(H)— group in the heterocyclic ring; and optionally a high functionality long chain hydrocarbyl substituted dicarboxylic acid material. Preferred heterocyclic nitrogen reactants are disclosed to be benzotdazole and tolyltriazole.

U.S. Pat. No. 5,2718,56 discloses oil soluble polymers useful as dispersant, viscosity index improver, antiwear and antioxidant additives. The polymers are prepared by reacting a heterocyclic nitrogen compound containing at least one —N(H)— group in the ring, an aldehyde and an amino-substituted polymer as disclosed above in '370. Preferred heterocyclic nitrogen compounds are disclosed to be benzotriazole and tolyltriazole.

There is a continuing need to develop new additives for fuel and lubricating oil compositions, especially additives which can effectively impart more than one property. An advantage ofmultifunctional additives to the formulator is that two or more discrete additives can be replaced with a single additive, thereby avoiding or minimizing the incompatibility problems and adverse interactions which can often accompany the use of several monofunctional additive components in a composition. The present invention provides additives which act as viscosity modifier-dispersants and provide antioxidancy as well.

SUMMARY OF THE INVENTION

The present invention relates to certain novel compositions of matter, quinone grafted amine-containing polymers and the process for making them. The polymers are made by grafting one or more quinone molecules to reactive primary or secondary amino groups in pre-polymerized polymers such as EPSA-PAM. EPSA-PAM as used herein refers to a reaction product of ethylene/propylene copolymer succinic anhydride (EPSA) and polyamine (PAM) or any suitable amine as disclosed hereinafter. The process may be carded out under conditions of temperature and pressure effective to facilitate the reaction of the quinone and polymer, preferably in a polymer melt or with the polymer and quinone in a suitable solvent.

The polymers of the present invention also include for example EPDM-NH$_2$ (i.e. ethylene/propylene diene monomer containing terpolymer-amine) which as the term used herein refers to amino-substituted ethylene propylene norbornene terpolymers.

The present invention relates to lubricating oil compositions comprising base oil and an effective dispersant, antioxidant, and viscosity modifying amount of an oil soluble reaction product of at least one quinone compound or substituted quinone compound and the reaction product of a long chain hydrocarbyl substituted mono- or dicarboxylic acid or its anhydride, wherein said long chain hydrocarbyl has a number average molecular weight ($\overline{M}_n$) of from about 20,000 to about 500,000 and an amine containing at least 2 reactive amino groups (e.g. nitrogens) selected from the group consisting of primary and secondary amino groups, wherein the reaction product contains at least one reactive amino group selected from the group consisting of primary and secondary amino groups.

The present invention also relates to lubricating oil compositions comprising base oil and an effective dispersant, antioxidant, and viscosity modifying amount of an oil soluble reaction product of at least one quinone compound or substituted quinone compound and an amine-containing polymer having at least one reactive amine group selected from the group consisting of primary and secondary amines, wherein said polymer is formed by the process of polymerizing ethylene with an alpha-olefin and an organometallic compound masked nitrogen-containing monomer, followed by deashing to remove the organometallic compound, wherein said polymer has an $\overline{M}_n$ of 20,000–500,000.

The present invention further relates to oil soluble reaction products, useful as an antioxidant-dispersant-viscosity modifiers for lubricating oil, comprising the reaction product of at least one quinone compound or a substituted quinone compound and (a) an oil soluble ethylene copolymer comprising about 15–90 wt. % ethylene and about 10–85 wt. % of one or more C$_3$–C$_{28}$ alpha-olefin, having an $\overline{M}_n$ of about 20,000–500,000 and grafted with an ethylenically unsaturated carboxylic acid material having 1–2 carboxylic acid groups or anhydride groups;

(b) an alkylene or oxyalkylene amine having at least two primary amine groups selected from the group consisting of (i) alkylene polyamines having alkylene groups of about 2–7 carbon atoms and 2–11 nitrogens, and, (ii) polyoxyalkylene polyamines wherein the alkylene groups contain 2–7 carbon atoms and about 3–7 oxyalkylene groups;

(c) a long chain hydrocarbyl substituted succinic anhydride or acid having 50–400 carbon atoms; and optionally, (d) a capping agent.

The reaction of EPDM-NH$_2$ when containing many amino groups per polymer chain with benzoquinone yields a crosslinked gel which is insoluble in most common organic solvents such as THF, heptane, xylene, etc. To overcome this problem the reaction can be extended to, for example, naphthoquinone that can react only with the amine on the quinone side of the naphtoquinone molecule and does not couple or chain extend the polymer. Such naphthoquinone chemistry may be useful where it is desired to react a quinone with a nucleophile without chain extension.

The invention includes a process for producing a composition useful as a fuel additive or lubricating oil additive comprising the steps of providing at least one quinone compound; providing an amine-containing polymeric material as described above; and contacting the quinone compound with the amine-containing polymeric material under conditions and for a time sufficient to react the quinone compound with at least a portion of the reactive amino groups to form a product mixture containing an oil soluble adduct of the quinone compound and the amine-containing polymeric material.

The compositions of the present invention include the products produced by the processes disclosed herein. The invention includes lubricating oil compositions and concentrates and fuel oil compositions and concentrates containing the above-described adducts. The adducts effectively impart viscosity modifying, detergent, antioxidant, and anticorrosion properties to the compositions and concentrates.

BRIEF DESCRIPTION OF THE DRAWING

FIG. 1 is a graphical plot showing weight loss by thermal gravimetric analysis ("TGA") of the reaction product of naphthoquinone with an ethylene propylene diene monomer containing terpolymer amine adduct (EPDM-NH$_2$) of Example 5, relative to the TGA for the EPDM-NH$_2$ itself, as prepared in Example 4.

DETAILED DESCRIPTION OF THE INVENTION

Amine-containing polymers used as starting materials for the compounds of the present invention can be prepared by a variety of procedures known to those skilled in the art. One approach is to incorporate the primary or secondary amine functionality during the polymerization process. A very desirable and practical route to polymerization of ethylene and alpha olefins is the well known use of Ziegler catalysts. The copolymerization of ethylene (CE) and propylene (P), for example, using Ziegler type catalysts, can give rise to EP copolymers of very high molecular weight of precisely controlled structures. These copolymers have found a wide variety of applications, including lubricant additives, as viscosity modifiers for mineral oils and synthetic lubricants. These polymers in unmodified form are not suitable as starting materials. However, introduction of suitable termonomers which contain reactive primary or secondary amine groups (e.g., during the Ziegler polymerization process) forms a material containing the reactive amine functionality needed for the instant invention. U.S. Pat. No. 5,030,370 discloses such amino-substituted interpolymers which comprise amino-substituted ethylene propylene norbornene terpolymers and is incorporated by reference herein in its entirety for all purposes. U.S. Pat. No. 5,030,370 discloses the best mode know for preparing the EPDM-NH$_2$ used in the present invention.

Similarly, a hydrocarbon polymer such as the EP copolymer described above can be modified by reaction with a functional group, such as maleic anhydride, to produce an ethylene-propylene polymer/succinic anhydride adduct (EPSA) by procedures well known to those skilled in the art. The subsequent reaction of EPSA with a polyamine (PAM) such as diethylene triamine results in an amine containing polymer suitable for use as a starting material in this invention (EPSA-PAM). This procedure is representative of a variety of techniques wherein a hydrocarbon polymer may be modified subsequent to polymerization to permit reaction with a polyamine to give the desired amine-containing polymer starting material for use in the present invention. U.S. Pat. No. 4,517,104 discloses such ethylene propylene copolymers reacted with, for example, maleic anhydride in the presence of a peroxide to yield EPSA, addition of an alkenyl succinic anhydride and subsequent reaction with a polyamine such as diethylene triamine (EPSA-PAM). U.S. Pat. No. 4,517,104 is incorporated by reference herein in its entirety for all purposes. U.S. Pat. No. 4,517,104 discloses the best mode known for preparing the EPSA-PAM used in the present invention.

As illustrated by the preceding examples, the amine-containing polymer starting materials may be prepared by a variety of well known procedures including those where the amine group is incorporated into the polymer during the polymerization process or where the polyolefin is subsequently reacted with a bridging group (such as maleic anhydride) and then the appropriate polyamine is further reacted to create the final amine-containing polymer starting material.

Hydrocarbon Polymer

The term "polymer" as used herein, means any co-, ter or tetrapolymer (e.g., ethylene-propylene copolymer, ethylene propylene diene monomer-containing polymer, etc.)

The hydrocarbon polymer can be any oil soluble hydrocarbon polymer having a number average molecular weight ("$\overline{M}_n$") in the range of from about 20,000 to about 500,000, (e.g., 20,000–300,000), preferably from about 20,000–250,000, (e.g., 20,000–200,000), more preferably from about 40,000–150,000 (e.g., 40,000–100,000) and most preferably from about 60,000–100,000 (e.g., 60,000–80,000). The $\overline{M}_n$ can be determined by several known techniques such as size exclusion chromatography, which is also known as gel permeation chromatography ("GPC"). GPC also provides the molecular weight distribution ("MWD"), also referred to as polydispersity and determined by the ratio of weight average molecular weight ("$\overline{M}w$") to $\overline{M}_n$. MWD is not a critical aspect of the hydrocarbon polymers employed in this invention. Typically, however, the hydrocarbon polymers have MWD of less than about 6.

Useful hydrocarbon polymers for practicing this invention include olefin polymers comprising a major molar amount of $C_2$–$C_{28}$ hydrocarbon monoolefin; e.g., $C_2$–$C_5$ hydrocarbon monoolefin. The polymers can be homopolymers such as polypropylene and polyisobutylene or preferably copolymers such as ethylene-propylene copolymer and ethylene-propylene terpolymers, propylene-isobutylene copolymer, isobutylene-styrene copolymer, etc. The polymers can be butene polymers prepared by polymerization of mixtures of isobutylene, butene-1 and butene-2. Polybutene containing up to about 40 mole % monomer units derived from butene-1 and butene-2 is also a useful polymer. Other copolymers (e.g. terpolymers) include those in which a minor molar amount of the monomers, e.g., 1–10 mole %, is a $C_4$–$C_{18}$ non-conjugated diolefin such as EPDM. EPDM copolymers include copolymers of ethylene and propylene with dicyclopentadiene, with ethylidene norbornene and with 1,4-hexadiene.

The olefin polymers may contain aromatic groups (especially phenyl groups and lower alkyl-substituted phenyl groups) and cycloaliphatic groups such as would be obtained from polymerizable cyclic olefins. Accordingly, the monoolefin monomers from which the olefin polymers are prepared can contain aromatic (e.g., styrenyl) and cycloaliphatic groups. However, the olefin polymers preferably have only a small content of such groups (about 10 wt. % or less) and more preferably are free from such groups.

As defined herein, the term hydrocarbon polymers also include polymers containing non-hydrocarbon moieties such as lower alkoxy, hydroxy and carbonyl, wherein the non-hydrocarbon moieties do not substantially interfere with the functionalization and derivatization chemistries employed in the present invention. When present, such substituted hydrocarbon groups normally will not contribute more than about 10 wt. % of the total weight of the hydrocarbon polymers. Consequently, where the hydrocarbon polymer is an olefin polymer, olefin and diolefin monomers from which the polymer is prepared can also contain such moieties.

Preparing the olefin polymers as described above which meet the various criteria for $\overline{M}_n$ and $\overline{M}_w/\overline{M}_n$ is within the skill of the art and does not comprise part of the present invention. Techniques readily apparent to those skilled in the art include controlling polymerization temperatures, regulating the amount and type of polymerization initiator and/or catalyst, employing chain terminating groups in the polymerization procedure, and the like. Other conventional techniques such as stripping (including vacuum stripping) a very light end and/or oxidatively or mechanically degrading high molecular weight olefin polymers to produce lower molecular weight olefin polymers can also be used.

The hydrocarbon polymer may be completely saturated, as for example an ethylene-propylene copolymer made by conventional Ziegler-Natta synthesis using hydrogen as a moderator to control molecular weight.

The hydrocarbon polymer can be derived from a mixture or blend of two or more different hydrocarbon polymers, such as a two ethylene copolymer blend disclosed in U.S. Pat. No. 5,427,702 which is incorporated by reference herein in its entirety. Therein is disclosed a mixture of a first ethylene/propylene copolymer and a second ethylene/propylene copolymer, wherein said second copolymer differs from said first copolymer by at least 5 wt. % ethylene content. The choice of hydrocarbon polymers employed depends to a degree on the type of functionalization chemistry employed. When a functionalization chemistry requires unsaturation, a mixture containing unsaturated hydrocarbon polymers are required. On the other hand, a mixture of saturated and/or unsaturated hydrocarbon polymers can be employed for other functionalization chemistries, such as free radical grafting when introducing carboxylic moieties to the polymer, where unsaturation is not required.

Whatever functionalization chemistry is employed, the hydrocarbon polymers can be mixed together prior to charging to the reaction zone, or they can be charged separately to the reaction zone. When charged separately, the polymers can be added simultaneously or sequentially in any order. When charged sequentially, subsequently charged polymers must be present in the reaction zone for a time and under conditions sufficient to effect the desired functionalization.

When two hydrocarbon polymers are employed together, they are generally present in a weight:weight ratio of from about 10:90 to about 90:10 and preferably f18 from about 20:80 to 80:20. When more than two polymers are employed, each polymer is present in an amount of at least about 5 wt. %, and preferably at least about 10 wt. %.

An illustrative hydrocarbon polymer mixture comprises ethylene propylene copolymers A and B having number average molecular weights (Mn) of from about 20,000-100,000, wherein the blend weight ratio of A:B is from about 2.3:1 to about 0.18:1, copolymer A comprises from about 30 to about 60 wt. % ethylene and from about 20 to about 40 wt. % propylene, copolymer B comprises from about 60 to about 80 wt. % ethylene and from about 40 to about 20 wt. % propylene and said A and B copolymers differ by at least 5 wt. % ethylene content.

AMINE-CONTAINING POLYMERIC MATERIALS

The amine-containing polymeric materials employed in this invention may be a hydrocarbon polymer, as earlier defined herein, which has been chemically modified to contain within its structure at least one primary or secondary amino group. Alternatively, the amine-containing polymeric material can be prepared by polymerization ethylene and/or one or more alpha-olefin monomers with a suitable nitrogen-containing monomer, wherein the resulting polymer either comains, or can be subsequently modified by chemical treatment of the N-containing moieties directly incorporated into the polymer to comain, at least one primary or secondary amino group.

By "amine", "amino group", "amino-containing" and "amino-substituted" is meant a primary or secondary amine or amino group that is available for bonding with or grafting to a quinone under the conditions of the process of the present invention. The amino group(s) may be contained or isolated in one monomer of the polymer (e.g., ethylene propylene amine functionalized terpolymer) or may be present in a plurality of locations EPDM-NH$_2$. The terms "graft", "bond", etc., when applied to the attachment of the quinone to the starting polymer means the reaction of a quinone with a pre-existing or presynthesized polymer containing a reactive primary or secondary amino group.

AMINE-CONTAINING DERIVATIVES OF HYDROCARBON POLYMER-SUBSTITUTED MONO- OR DICARBOXYLIC ACID PRODUCING MATERIALS

In all cases, the starting polymer must contain or be modified before addition of the quinones to contain at least one reactive amine (i.e. primary or secondary amino) group in order to provide a site for grafting the quinone to produce the polymers of the present invention.

Amine-containing polymers can be formed by first functionalizing a hydrocarbon polymer to contain within its structure mono- and/or dicarboxylic acid producing moieties (e.g. acid, anhydride or ester groups) and then subsequently reacting the hydrocarbon-polymer substituted mono- and/or dicarboxylic acid producing materials with an amine compound containing at least two reactive amino groups, i.e., primary and secondary amino groups. U.S. Pat. No. 4,517,104 discloses reactions of this type and is incorporated by reference herein in its entirety for all purposes.

The hydrocarbon polymer substituted mono- or dicarboxylic acid producing material, e.g., acid, anhydride, or ester, used in the invention includes the reaction product of a long chain hydrocarbon polymer, generally a polyolefin, with a monounsaturated carboxylic reactant. The monounsaturated carboxylic reactant is typically a monounsaturated monocarboxylic acid producing compound or a monounsaturated dicarboxylic acid producing compound or mixtures thereof. Preferably, the reactant comprises at least one member selected from the group consisting of (i) monounsaturated $C_4$-$C_{10}$ dicarboxylic acid wherein (a) the carboxyl groups are vicinyl, (i.e., located on adjacent carbon atoms) and (b) at least one, preferably both, of said adjacent carbon atoms are part of said mono unsaturation; (ii) derivatives of(i) such as anhydrides or $C_1$-$C_5$ alcohol derived mono- or diesters of (i); (iii) monounsaturated $C_3$-$C_{10}$ monocarboxylic acid wherein the carbon-carbon double bond is conjugated to the carboxy group, i.e., of the structure

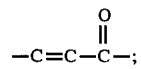

and (iv) derivatives of(iii) such as $C_1$-$C_5$ alcohol derived monoesters of (iii). Upon reaction with the polymer, the monounsaturation of the monounsaturated carboxylic reactant becomes saturated. Thus, for example, maleic anhydride becomes a polymer substituted succinic anhydride, and acrylic acid becomes a polymer substituted propionic acid.

Exemplary monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$-$C_4$ alkyl) acid esters of the foregoing, e.g., methyl maleate, ethyl fumarate, methyl fumarate, etc.

The hydrocarbon polymer can be functionalized by reaction with the monounsaturated carboxylic reactant using a variety of methods.

The hydrocarbon polymer can be functionalized to contain carboxylic acid moieties by grafting with a monounsaturated carboxylic reactant, as described above, in the presence of a free radical initiator, wherein the carboxylic acid moieties are randomly attached along the polymer chains.

When performed in solution, the grafting takes place at an elevated temperature in the range of about 100°–260° C., preferably 120°–240° C. Free-radical initiated grafting is accomplished in a mineral lubricating oil solution containing, e.g., 1–50 wt. % polymer, preferably 5–30 wt. % polymer, based on the initial total oil solution.

The free-radical initiators which may be used include peroxides, hydroperoxides, and azo compounds, and are preferably those which have a boiling point greater than about 100° C. and thus decompose thermally within the grafting temperature range to provide free-radicals. Representative of these free-radical initiators are azobutyronitrile, 2,5-dimethylhex-3-ene-2,5-bis-tertiary-butyl peroxide and dicumene peroxide. The initiator is typically used in an amount of between 0.005% and 1% by weight based on the weight of the reaction mixture solution. Typically, the aforesaid monounsaturated carboxylic reactant material and free-radical initiator are used in a weight ratio range of from about 10:1 to 30: 1, preferably 3: 1 to 6: 1. The grafting is preferably carded out in an inert atmosphere, such as under a nitrogen blanket.

In the solid or melt process for forming a graft polymer, the unsaturated carboxylic acid with the optional use of a radical initiator is grafted on molten copolymer using an extruder, masticator or other sheafing equipment. The temperature of the molten material in this process may range from about 150°–400° C. Processes for free-radically grafting polymers are described, for example, in U.S. Pat. Nos. 4,505,834, 4,749,504 and 4,863,623; and in GB-A-2055852. U.S. Pat. No. 5,424,367 discloses multiple sequential chemical reactions including peroxide initiated reaction with maleic anhydride and amination on a polymeric feedstock carried out in an extruder with multiple reaction zones and is incorporated by reference herein in its entirety for all purposes.

Normally, not all of the hydrocarbon polymer is functionalized, regardless of which of the above functionalization chemistries is employed. Unfunctionalized polymer typically is not removed from the reaction mixture (because such removal is difficult and would be commercially infeasible). The product mixture, stripped of any residual reactant, is then employed for further reaction with the amine compound.

Amine compounds useful as reactants with the hydrocarbon polymer substituted mono- or dicarboxylic acid material, i.e., acylating agent, are those containing at least two reactive amino groups, i.e., primary and secondary amino groups, and mixtures of such amines. They include polyalkylene polyamines, of about 2–60 (e.g. 2–30), preferably 2–40 (e.g. 3–20) total carbon atoms and about 1–12 (e.g., 2–9), preferably 3–12, and most preferably 3–9 nitrogen atoms in the molecule. These amines may be hydrocarbyl amines or may be hydrocarbyl amines including other groups, e.g., hydroxy groups, alkoxy groups, amide groups, nitriles, imidazoline groups, and the like. Such amines should be capable of reacting with the carboxylic acid moieties in the functionalized hydrocarbon polymer and with the quinone compounds through the amino groups.

Non-limiting examples of suitable amine compounds include: 1,2-diaminoethane; 1,3-diaminopropane; 1,4-diaminobutane; 1,6-diaminohexane; polyethylene amines such as diethylene triamine ("DETA"), triethylene tetramine, and tetraethylene pentamine ("TEPA"); polypropylene amines such as 1,2-propylene diamine, di-(1,2-propylene) triamine and di-(1,3-propylene)triamine; N,N-dimethyl-1,3-diamino-propane; N,N'-di-(2-aminoethyl) ethylene diamine; 3-dodecylpropylamine; N-dodecyl-1,3-propane diamine; mono-, di-, and tri-tallow amines; amino morpholines such as N-(3-aminopropyl) morpholine; and mixtures thereof.

Useful amines also include alicyclic diamines, commercial mixtures of amine compounds such as polyethylene polyamines averaging 5–7 nitrogen atoms per molecule available under the trade names E-100 (Dow Chemical) and HPA-X (Union Carbide), polyoxyalkylene polyamines, and the polyamido and related amines described in U.S. Pat. Nos. 4,857,217, 4,963,275, and 4,956,107.

The amine compound can be a heavy polyamine, which is defined herein as a mixture of higher oligomers of poly-alkylene polyamines, having an average of at least about 7 nitrogens per molecule. A preferred heavy polyamine is a mixture of polyethylene polyamines containing essentially no TEPA, at most small amounts of pentaethylene hexamine, and the balance oligomers with more than 6 nitrogen and more branching than conventional commercial polyamine mixtures, such as the E-100 and HPA-X mixtures noted in the preceding paragraph. A useful heavy polyamine composition is commercially available from Dow Chemical under the tradename HA-2. Useful heavy polyamines are further described in U.S. Ser. No. 273,294, filed Jul. 11, 1994, herein incorporated by reference.

The amine-containing derivative may be prepared by reacting the amine compound with the hydrocarbon polymer substituted mono- or dicarboxylic acid material dissolved or diluted in an inert organic liquid (e.g., mineral oils) to a concentration of about 5–95 wt. %. The reaction is generally conducted at about 100° to 250° C. for about 1–10 hrs. until the desired amount of water is removed. The heating is preferably carded out to favor formation of imides and/or amides, rather than amides and salts. Reaction ratios of mono- or dicarboxylic acid material to equivalents of amine can vary considerably, depending upon the reactants and type of bonds formed. Generally from 0.1–1.0, preferably about 0.2–0.6, e.g. 0.4–0.6, moles of mono- or dicarboxylic acid moiety content is used, per equivalent of amine. Of course, the relative proportions of amine to polymer substituted carboxylic material and the reaction conditions are controlled such that the resulting derivative has amino groups available for subsequent reaction with a quinone compound.

The amination reaction step can also take place in a melt process as disclosed in U.S. Pat. No. 5,424,367 (described hereinbefore).

Post Treatment of Amine Containing Derivatives of Hydrocarbon Polymers

A variety techniques are disclosed for pre and post treatment of amine containing derivatives of hydrocarbon polymers to prevent gellation, crosslinking, viscosity increase, etc. For example, U.S. Pat. No. 4,517,104 (discussed hereinbefore) discloses the use of alkenyl succinic anhydrides having 50–400 carbons. U.S. Pat. No. 4,803,003, which is incorporated by reference herein in its entirety for all purposes, discloses the use of $C_{12}$–$C_{18}$ hydrocarbyl substituted succinic anhydride to minimize the viscosity change over time of derivatized ethylene copolymers. MFVM capping agents used to prevent viscosity increase (e.g. growth) include alkyl benzene sulfonic acid, acetic anhydride, tetrapropyl succinic anhydride and tetrapropyl succinic acid.

Hydrocarbon Polymer Substituted With Amine

Amine-containing polymers used in this invention can also be prepared by the direct incorporation of masked, nitrogen-containing monomers ("MNCM") into homopolymers and copolymers, including polyolefins such as ethylene-propylene copolymers ("EPM"), to form copolymers, terpolymers and tetrapolymers containing the MNCM. The nitrogen-containing monomer is an unsaturated compound which is copolymerizable with polymer chain monomers ("PCM"), viz. olefins such as ethylene and propylene, using a Ziegler catalyst. The amine-substituted polymers preferably comprise polymer chains exhibiting a generally uniform distribution of amino functionality and a low halogen content and are essentially devoid of organic halides.

The term nitrogen-containing monomer ("NCM") means the unsaturated, nitrogen-containing monomers which contain at least one primary amino and/or secondary amino group. Exemplary of nitrogen-containing monomers are norbornenyl-methyl amines and imines and preferably 5-norbornenyl-2-methylamine, 5-norbomene-2,3-dimethylamine, 5-norbomene-2-ethylamine.

The term masked, nitrogen-containing monomer (or MNCM) refers to the reaction products formed by the reaction of the nitrogen-containing monomer and a metallic organic compound masking agent. The masked, nitrogen-containing monomer so formed is used as the actual comonomer in the polymerization process. The NCM is preferably masked in a reaction with non-halogenated metallic compounds such as organoaluminum compounds under controlled conditions and then contacted with suitable monomers for production of the amine-containing polymer.

The polymer chain monomers normally used in the production of these polymers, preferably ethylene and $C_3$–$C_{25}$ alpha-olefins and mixed olefins may optionally contain a third type of monomer which is an easily polymerizable non-conjugated diene, suitably straight chain, hydrocarbon di-olefins or cycloalkenyl substituted alkenes, having about 6 to about 15 carbon atoms.

The polymerization process is performed in an otherwise conventional manner using suitable methods and catalysts known to be effective for such polymerization and can be carried out at any temperature and pressure suitable for Ziegler catalysis. The polymerization can be carded out in the presence of a molecular weight regulator such as hydrogen to produce an amine-substituted polymer having any particular desired molecular weight. The polymerization is quenched at the exit of the reactor by the introduction of suitable amounts of water, lower alkanol, or aqueous acid (e.g. aqueous HCl) as quench liquid. The desired amino functional group incorporated into the amine-substituted polymer as the masked functional group, can be regenerated by removal of the masking metal, through use of conventional de-ashing techniques, wherein the quenched polymerization products, containing masked-functionalized polymer, the polymerization catalysts, and unreacted monomers, are contacted with an aqueous liquid, e.g., water, aqueous solutions containing suitable mineral acids. The resulting hydrolysis reactions ("de-ashing") liberate the metal masking agent and generate the amino functional group, thereby forming the polymer. Further description of the formation of these polymers is found in U.S. Pat. No. 5,030,370 which is incorporated by reference herein in its entirety for all purposes.

The compositions of the present invention are to be used as additives in lubricating oil compositions and in fuel compositions. Accordingly, the number of amino groups in the amine-containing polymer materials used to form the inventive compositions must be controlled to maintain oil solubility. Generally amine-containing polymeric materials formed by chemical modification of hydrocarbon polymers which are useful in making the additive of the invention have on average within their structure at least about 0.5 and preferably at least about 0.7 (e.g., 0.8–3) reactive amine groups per molecule. Methods for controlling the number of amino groups in the polymeric materials and for controlling the ratio of amino groups to quinone compound are in the possession of the skilled artisan in light of the teachings presented herein.

Quinone Compounds

Quinone compounds useful in the present invention include 1,2- and 1,4-quinone compounds having at least one unsubstituted position on the quinone ring and mixtures thereof. Suitable quinones include 1,4-quinone compounds of formula

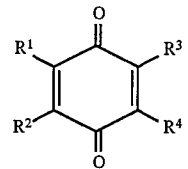

wherein $R^1$, $R^2$, $R^3$ and $R^4$ are independently selected from hydrogen, halogen, hydrocarbyl, and substituted hydrocarbyl; provided that at least one of $R^1$, $R^2$, $R^3$ and $R^4$ is hydrogen; or $R^3$ and $R^4$ are as defined above and $R^1$ and $R^2$ are joined to form a hydrocarbocyclic ring or a substituted hydrocarbocyclic ring, provided that at least one of $R^3$ and $R^4$ is hydrogen. 1,4-Quinone compounds of formula (I) include, but are not limited to, 1,4-benzoquinone, 2-methyl-1,4-benzoquinone, 2-chloro-1,4-benzoquinone, 2,5-dimethyl-1,4-benzoquinone, 1,4-naphthoquinone, 2-methyl-1,4-naphthoquinone, 2,5- dichloro-1,4-benzoquinone, 1,4-anthraquinone, 2-chloromethyl-1,4-benzoquinone, and 5,6,7,8-tetrahydro-1,4-naphthoquinone.

Suitable quinones include 1,2-quinone compounds of formula (II):

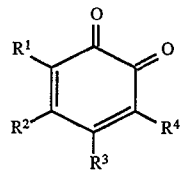

wherein $R^1$, $R^2$, $R^3$ and $R^4$ are as defined above for formula (V), provided that at least one of $R^1$, $R^2$, $R^3$ and $R^4$ is hydrogen; or $R^3$ and $R^4$ are as defined above for formula (I) and $R^1$ and $R^2$ are joined to form a hydrocarbocyclic ring or a substituted hydrocarbocyclic ring, provided that at least one of $R^3$ and $R^4$ is hydrogen; $R^1$ and $R^4$ are as defined above and $R^2$ and $R^3$ are joined to form a hydrocarbocyclic ring or a substituted hydrocarbocyclic ring, provided that at least one of $R^1$ and $R^4$ is hydrogen.

1,2-Quinone compounds of formula (b) include, but are not limited to, 1,2-benzoquinone, 1,2-naphthoquinone, 3-chloro-1,2-naphthoquinone, 3-chloro-1,2-benzoquinone, 3-methyl-1,2-benzoquinone, 4-methyl-1,2-benzoquinone, 5,6,7,8-tetrahydro-1,2-naphthoquinone, 1,2-anthraquinone, and 3,4-dimethyl-1,2-benzoquinone.

The preferred quinone compounds for use in the present invention are 1,4-benzoquinone, 2-methyl-1,4-benzoquinone, 1,2-naphthoquinone, and 1,4-naphthoquinone. The most preferred quinone compound is 1,4-benzoquinone, which is alternatively referred to herein simply as benzoquinone.

Other compounds such as hydroquinones or substituted hydroquinones which readily oxidize to quinones can also be used for this reaction.

Methods for preparing the quinone compounds are known to persons of ordinary skill in the art. See, for example, the methods disclosed in *Kirk-Othmer Encyclopedia of Chemical Technology*, volume 19, 3d edition (Wiley-Interscience, New York, 1982), pp. 598–606.

Reaction of Quinone Compounds with Amine-containing Polymeric Materials

The quinone compounds are reacted with the amine-containing polymeric materials heretofore described; i.e., polymer materials having long chain hydrocarbon character and containing at least one reactive primary or secondary amino group, to produce the composition of the invention useful as a fuel or lubricating oil additive. The reaction may be carded out by contacting an effective amount of a quinone compound with an amine-containing polymer material for a time and under conditions sufficient to form an adduct having dispersant-detergent, anti-oxidant, and/or anti-corrosion properties. The quinone compound must have at least one unsubstituted position on the quinone ring (i.e. at least one quinone ring hydrogen) in order to undergo reaction with the amine grafted polymeric material. A quinone compound with more than one ring hydrogen can react with different polymer molecules, each containing one reactive amino group, to join or couple them together. Furthermore, if the polymeric material has two or more reactive amino sites per molecule and the quinone has at least two quinone ring hydrogens, a more complex adduct can result, even to the point of producing an oil insoluble, crosslinked material.

Those skilled in the art will recognize that the amount of quinone compound utilized will depend upon (i) the number of reactive amino groups present in the mine-containing polymeric material, (ii) the number of quinone ring hydrogens in the quinone compound, and (iii) the number of such amino groups which it is desired to react. The skilled artisan will also recognize that, where coupling or crosslinking is possible, the degree of coupling or crosslinking can be controlled (e.g., to preserve oil solubility or to enhance effectiveness of the resulting adduct as an additive) by suitable manipulation of reaction conditions in combination with controlling the ratio of the number of quinone ting hydrogens to the number of reactive amino groups in the polymeric material. Generally, it is preferred to use from about 0.01 to 4 moles, preferably from about 0.1 to 1 moles per mole of quinone compound per mole of reactive amino group in the polymeric material.

Normally, the quinone compound is contacted directly with the amine-containing polymer to form the adduct. As an alternative, however, the corresponding dihydroxyaromatic compound (e.g., hydroquinone) can be added and the quinone compound (1,4-benzoquinone) formed in situ by prior, simultaneous or subsequent contact of an oxidizing agent (e.g., air) with the reaction mixture.

In order to react the starting polymer and quinone or substituted quinone both must be present in a form or medium that will produce sufficient contact and molecular mixing sufficient to carry out the reaction. This may be accomplished by dissolving the quinone in a suitable solvent, provided that the starting polymer is in a suitable form, condition, phase or medium to allow contact without altering its essential properties, e.g., by dissolving the polymer in a suitable solvent, heating to fluidity, or extruding and running the reaction in the melt phase. It is within the skill of one ordinarily skilled in the an to select the appropriate means and/or media for facilitating the contact and reaction between the quinones and polymer. For commercial purposes, use of a solventless process is preferred such as in a polymer melt in an extruder.

The adduct-forming reaction generally proceeds at atmospheric pressure, but elevated pressures can be used.

The reaction may be conducted using an inert solvent or diluent. Suitable solvent/diluents include toluene, xylene, mineral oil, THF, hexane, heptane, and the like.

The reaction temperature generally ranges from about 20° C. to the reflux temperature of the solvent when a solvent is used or to the decomposition temperature of the mixture. Preferably, the temperature ranges from about 25°–250° C., more preferably from about 50°–200° C.

Reaction time is generally from about I minute to 72 hrs., preferably from about 10 min. to 24 hrs, and more preferably 1–12 hours.

EPSA-PAM Benzoquinone Adduct

The reaction and product may be represented strictly for purposes of illustration by the following reaction between benzoquinone and 2 moles of an amine-containing derivative of a dicarboxylic acid producing material containing a reactive primary amino group:

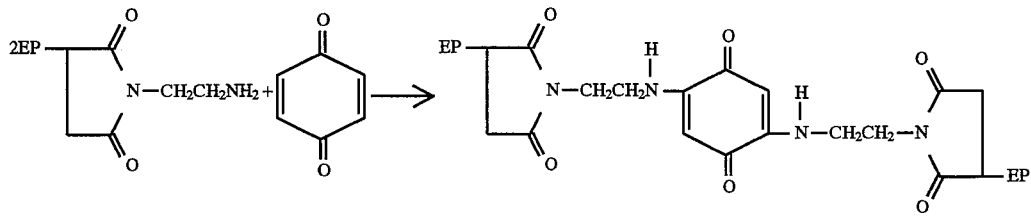

wherein EP is an ethylene-propylene copolymer. If the amine-containing EP derivative contained more than one reactive amino group per molecule, then the products will be more complex.

EPDM-NH$_2$-Naphthoquinone Adduct

The reaction and product may be represented strictly for purposes of illustration by the following reaction between naphthoquinone and an amino-substituted ethylene propylene norbornene terpolymer.

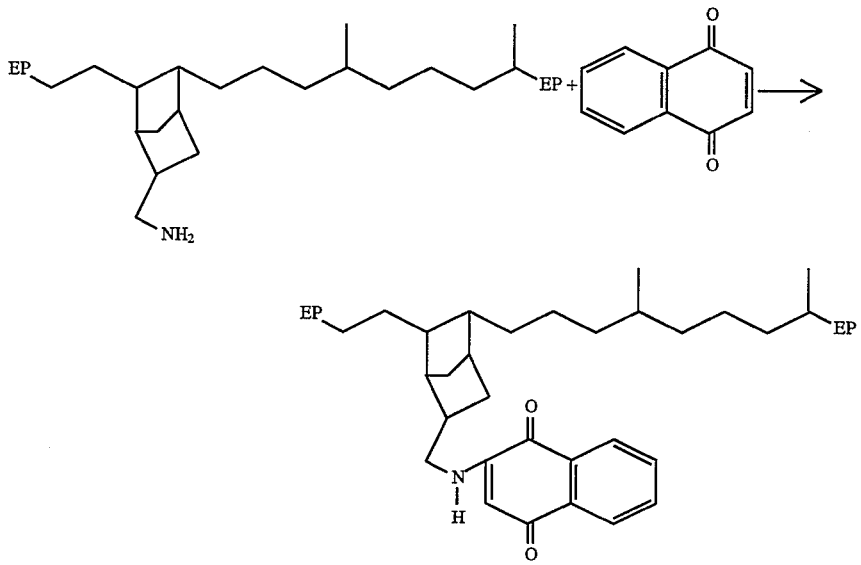

Lubricating Oil and Fuel Compositions

The quinone-amine-containing polymer adducts of the present invention possess good viscosity modifying, dispersancy, detergency, anti-corrosion and anti-oxidant properties, which make them useful as additives in fuels and in lubricating oils. The additives of the invention are used by incorporation into the lubricating oils and fuels. Incorporation may be done in any convenient way and typically involves dissolution or dispersion of the additives into the oil or fuel in a viscosity modifying; dispersant-, antioxidant-, and/or anti-corrosion-effective amount. The blending into the fuel or oil can occur at room or elevated temperature. Alternatively, the additives can be blended with a suitable oil-soluble solvent diluent (such as benzene, xylene, toluene, lubricating base oils and petroleum distillates, including the various normally liquid petroleum fuels noted below) to form a concentrate, and then the concentrate can be blended with a lubricating oil or fuel to obtain the final formulation. Such additive concentrates will typically contain on an active ingredient (A.I.) basis from about 10–80 wt. %, typically 20–60 wt. %, and preferably from about 40–50 wt. % additive, and typically from about 40–80 wt. %, preferably from about 40–60 wt. % base oil (or fuel) based on concentrate weight.

When the additives of this invention are used in normally liquid petroleum fuels such as middle distillates boiling from about 65–430° C., including kerosene, diesel fuels, home heating fuel oil, jet fuels, etc., a concentration of the additives in the fuel in the range of typically from about 0.001–0.5 wt. %, and preferably about 0.005–0.15 wt. %, based on the total weight of the composition, will usually be employed.

Fuel compositions of this invention can contain other conventional additives in addition to the additive of the invention. These can include anti-knock agents, cetane improvers, metal deactivators, deposit modifiers/preventors, and antioxidants.

The additives of the present invention find their primary utility in lubricating oil compositions which employ a base oil in which the additives are dissolved or dispersed therein. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Natural oils include animal oils and vegetable oils (e.g., castor, lard oil), liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.) Alkylene oxide polymers and interpolymers and derivatives thereof where the terminal hydroxyl groups have been modified by esterification, etherification, etc., constitute another class of known synthetic lubricating oils. Another suitable class of synthetic lubricating oils comprises the esters of dicarboxylic acids. Esters useful as synthetic oils also include those made from $C_5$–$C_{12}$ monocarboxylic acids and polyols and polyol ethers such as neopentyl glycol, etc. Silicon-based oils such as the polyalkyl-, polyaryl-, polyalkoxy-, or polyaryloxysiloxane oils and silicate oils comprise another useful class of synthetic lubricants. Unrefined, refined and rerefined oils can be used in the lubricants of the present invention.

The additives of the present invention may be mixed with other types of conventional additives, each selected to perform at least one desired function. Among the other additives which may be in the lubricating oil formulation are dispersants, metal containing detergent/inhibitors, other viscosity modifiers, and anti-wear agents. The metal detergent/ inhibitors are generally basic or overbased alkali or alkaline earth metal salts or mixtures thereof (e.g. mixtures of Ca and Mg salts) of one or more organic acids (e.g., sulfonates, naphthenates, phenates and the like). Other viscosity modifiers include polyesters, optionally defivatized to impart dispersancy or some other property, having number average molecular weights of from $10^3$–$10^6$. The anti-wear agents are typically oil-soluble zinc dihydrocarbyl dithiophosphates.

Other additives which may be employed in the formulation are pour point depressants, friction modifiers, foam inhibitors, demulsifiers, flow improvers, and seal swell control agents. Conventional dispersants, antioxidants, and corrosion inhibitors can also be employed in addition to the additives of the invention.

Compositions, when containing one or more of these additives, typically are blended into the base oil in amounts which are effective to provide their normal attendant function. In such compositions, the additives of the present invention are generally employed (e.g., as a viscosity modifier) in an amount of about 0.01–20 wt. %, preferably about 0.1–15 wt. %, most preferably 0.1–10 wt. %, based upon the total weight of the composition.

Additive concentrates comprising concentrated solutions of the additives of this invention together with one or more of these other additives can be prepared by adding the additives to the base oil, wherein the subject additives of this invention are present in concentrate amounts as described above. The collective amounts of the subject additive together with other additives is typically from about 2.5–90 wt. %, preferably about 15–75 wt. %, and most preferably about 25–60 wt. % additives with base oil as the balance. The concentrate will typically be formulated to contain the additives in the amounts necessary to provide the desired concentration in the final formulation when the concentrate is combined with a predetermined amount of base lubricant.

Unless otherwise indicated, all of the weight percents expressed herein are based on the active ingredient content of the additive, and/or upon the total weight of any additive package or formulation which will be the sum of the A.I. weight of each additive plus the weight of the total oil or diluent.

GENERAL CONDITIONS FOR EXAMPLES

A wide variety of amine containing polymers can be employed as starting materials to produce the compositions of the present invention. Some examples of those polymers, which are not intended to limit the scope of the invention, are as follows: (1) Ethylene propylene succinic anhydride-polyamine (EPSA-PAM), multifunctional viscosity modifier dispersants; and (2) ethylene propylene diene monomer-containing (EPDM) terpolymers containing primary or secondary amine groups pendant to the polymer chain (EPDM-$NH_2$).

The products of Examples 1, 2 and 3 are prepared by the reaction of a polymeric species with a suitable amine to create the amine-containing polymer. For Examples 4 and 5, the amine was incorporated into a high molecular weight polymer during the polymerization process. This wide variety of amine containing polymers indicates the spectrum of amine containing polymers which can be employed in the instant invention.

The following examples are representative of the multifunctional viscosity modifier-dispersant-antioxidants of the present invention.

EXAMPLE 1

EPSA-PAM (Comparative)

An intermediate (uncapped) multifunctional viscosity modifier was prepared for reaction with quinone substantially in accordance with the procedures found in Examples 1 and 3 of U.S. Pat. No. 4,517,104 as summarized below. However, actual weights, temperatures, times, etc. were different. U.S. Pat. No. 4,517,104 is incorporated by reference herein in its entirety and for all purposes.

166 pounds of an oil solution containing about 19.9 pounds of the ethylene-propylene copolymer having a T.E. of about 2.8 and consisting of about 43 wt. % ethylene and about 57 wt. % propylene, dissolved in 146.1 pounds of a mineral lubricating oil diluent were charged to a reactor along with 13.5 pounds of Solvent 100 Neutral Oil.

T.E. represents a number average molecular weight of approximately 60,000. It was an amorphous copolymer with a $\overline{M}_w/\overline{M}_n$ of less than 4.

Thickening efficiency (T.E.) is defined as the ratio of the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 SUS at 37.8° C., a viscosity index of 105 and an ASTM pour point of 0° F., (Solvent 150 Neutral) to a viscosity of 12.4 centistokes at 98.9° C., to the weight percent of a test copolymer required to thicken the same oil to the same viscosity at the same temperature. T.E. is related to ($\overline{M}_n$) and is a convenient, useful measurement for formulation of lubricating oils of various grades.

The reactor was a small heated kettle equipped with a charging line, stirrer, overhead water condenser, vacuum pump which gives a pressure of about 10 Kpa and a nitrogen inlet in order to maintain a nitrogen atmosphere. After stirring under nitrogen and vacuum for about 1¾ hrs. to remove moisture, the reactor was heated to 190° C. and 2.68 pounds of molten maleic anhydride were added to the reactor through the charging line, followed by the addition of about 0.74 pounds of Solvent 100 Neutral to flush the charging inlet. Next 0.36 pounds of ditertiary butyl peroxide dissolved in 0.36 pounds of Solvent 100 Neutral (S 100N) oil were added to the reactor through the charging line over about a 13 minute period followed by flushing of said line with 0.52 pounds of additional S 100N oil. Vacuum was applied to the reactor while nitrogen stripping over a period of about one hour while maintaining the kettle temperature at about 190°–195° C. A small sample of the reactor product was then titrated and had an acidity, due to the grafted maleic anhydride, of 0.11 meq./gram. Next, 18.5 pounds of polyisobutenyl suetinit anhydride having an ASTM D-64 Sap. No. of 112, and wherein the polyisobutenyl group had a number average molecular weight of about 900, dissolved in 54.5 pounds of the aforesaid S100N diluent oil were added to the reactor. Then 1.96 pounds ofdiethylene triamine (DETA) were slowly added to the reactor over a period of about 43 minutes followed by the addition of 0.60 pounds of oil as a flush for the charging line. When all the amine had been added, nitrogen stripping was carried out for three hours, while maintaining the 190°–195° C. temperature, followed by cooling and draining to give the product.

EXAMPLE 2

EPSA-PAM Reacted with Naphthoquinone (NQ)

Into a one liter four neck round bottom flask equipped with stirrer, thermometer, nitrogen inlet and nitrogen outlet was charged 300 g of EPSA-PAM prepared substantially in accordance with the procedures used to prepare the EPSA-PAM of Comparative Example 1. The EPSA-PAM was heated to 80° C. under nitrogen. Initially, 1.6 ml of formaline (37% aq. solution, 0.02 mole) was added and then 3.16 g (0.02 mole) naphthoquinone in 10 ml ethanol was added. The temperature of the reaction was held at 80° C. for 1 hour and then at 120° C. for 1 hour to remove ethanol and water. The product was then cooled down under nitrogen.

EXAMPLE 3

EPSA-PAM Reacted with Benzoquinone (BQ)

Into a one liter four neck round bottom flask equipped with stirrer, thermometer, nitrogen inlet and nitrogen outlet was charged with 300 g of EPSA-PAM prepared substantially in accordance with the procedures used to prepare the EPSA-PAM of Comparative Example 1. The EPSA-PAM was heated to 80° C. under nitrogen. Initially, 1.6 ml of formaline (37% aq. solution, 0.02 mole) was added and then 2.16 g (0.02 mole) benzoquinone in 10 ml ethanol was added. The temperature of the reaction was held at 80° C. for 1 hour and then at 120° C. for 1 hour to remove ethanol and water. The product was then cooled down under nitrogen.

The products from Examples 1, 2, and 3 were evaluated in the SIB dispersancy bench test.

SIB (Sludge Inhibition Bench Test)

The SIB Test forecasts the performance of a lubricant in a gasoline engine.

In the SIB test, a dispersant is added to a clear, bright supernatant oil obtained from a used crankcase oil composition that has been used in a taxicab. The used crankcase oil contains a base mineral lubricating oil, a viscosity modifier, a pour point depressant and a zinc dialkyldithiophosphate anti-wear additive, but itself has no dispersant additive. This supernatant oil has been separated from the oil insoluble sludge precursors which on heating under the conditions of the SIB test tend to form additional oil-insoluble deposits. The sludge inhibition of the dispersant is then determined by heating the dispersant-oil blend in air for several hours and comparing the amount of sludge (in mg) formed in the blend to the amount formed by a similarly treated "blank" containing only the oil. SIB values are reported on a normalized scale of 1 (high inhibition) to 10 (no inhibition).

A more detailed description of the SIB test can be found in U.S. Pat. No. 4,954,572 and U.S. Pat. No. 5,718,56, both incorporated herein by reference.

The SIB results are as follows:

| | Product | SIB mg* |
|---|---|---|
| Example | | |
| 1. | EPSA-PAM (comparative) | 6.45 |
| 2. | EPSA-PAM (NQ reacted) | 4.60 |
| 3. | EPSA-PAM (BQ reacted) | 4.35 |
| | Blank | 10.00 |

*Lower values indicate better SIB dispersancy performance.

The results show that modified (e.g., quinone adduct) EPSA-PAM has improved SIB performance compared to prior art EPSA-PAM.

EXAMPLE 4

Preparation of EPDM-NH$_2$ (Comparative)

An EPDM-NH$_2$ was prepared substantially in accordance with the procedures found in Example 6 of U.S. Pat. No. 5,030,370 as summarized below. However, actual weights, temperatures, times, etc. were different. U.S. Pat. No. 5,030,370 is incorporated by reference herein in its entirety and for all purposes.

13.2 ml. of 5-norbornene-2-methylamine (NBMA) (12.8 gm.) was added to 200 ml. of hexane. To this solution was added 81 ml. of a 20 wt. % solution of diisobutyl aluminum hydride (DIBAL-H) in hexane at 20° C. under a nitrogen blanket over a period of 90 seconds.

The resultant solution containing the MNCM was introduced into the polymerization reactor to prepare an amino-substituted EP interpolymer. The conditions of polymerization and results are shown below:

| Conditions | |
|---|---|
| Reactor = | 1 liter (CFSTR) |
| Temperature = | 30° C. |
| Pressure = | 500 kPa gauge |
| Agitation = | 1200 rpm |
| Residence Time = | 9 min. |
| Al/V Molar Ratio = | 10 for catalyst compounds |
| Feeds | |
| Hexane = | 4.22 kg/hr |
| Ethylene = | 67.5 g/hr |
| Propylene = | 162.1 g/hr |
| VCl$_4$ = | 0.53 g/hr |
| EADC = | 3.42 g/hr |
| Hydrogen = | 20 w ppm on ethylene |
| NCM (masked = as above) | 2.214 g/hr |

| Polymerization Parameters | | Polymer Proportion | |
|---|---|---|---|
| Rate (g/hr) | Catalyst Efficiency (g/g) | Ethylene Content (wt. %) | MNCM (conv. %) |
| 155 | 292 | 39 | 32 |

The resulting amine grafted ethylene propylene polymer was isolated as follows. 500 ml. of the hexane solution was mixed with a 10% solution of diluted HCl in 500 ml. of 1:1 water and HPA at 65° C. for 1 hour. At the end of the period, the water layer was removed and the supernatent hexane layer was washed with 500 ml. of water. The pH of the hexane layer was adjusted to 7 and the polymer recovered by evaporation of solvent. The deashed polymer was found to contain 0.06 wt. % N (as primary amine).

EXAMPLE 5

EPDM-NH$_2$ reacted with Naphthoqninone (NQ)

5 g of EPDM-NH$_2$ prepared substantially in accordance with the procedures used to prepare the EPDM-NH$_2$ of Comparative Example 4 was dissolved into 100 ml THF. To it was added 0.57 g (0.0036 mole) of naphthoquinone dissolved in 50 ml of THF. The product was stirred at room temperature for 24 hours and the resultant polymer product was precipitated with 200 ml acetone. IR spectra of the naphthoquinone reacted EPDM-NH$_2$ showed characteristic absorption peaks due to naphthoquinone along with the peaks due to an amine polymer. The polymer was soluble in THf, xylene and oil, suggesting that it was not crosslinked.

The naphthoquinone reacted product exhibited high bulk viscosity and forms free standing films on compression molding compared to the starting EPDM-NH$_2$ which is too weak to create a film of. The product of example 5 was evaluated in SIB dispersancy bench test. The results are as follows:

| | Product | SIB, mg |
|---|---|---|
| Example | | |
| 4. | EPDM-NH$_2$ | Not tested |
| 5. | EPDM-NH$_2$-NQ | 8.09 |
| | Blank | 10.00 |

Thermal Studies

Figure 1:
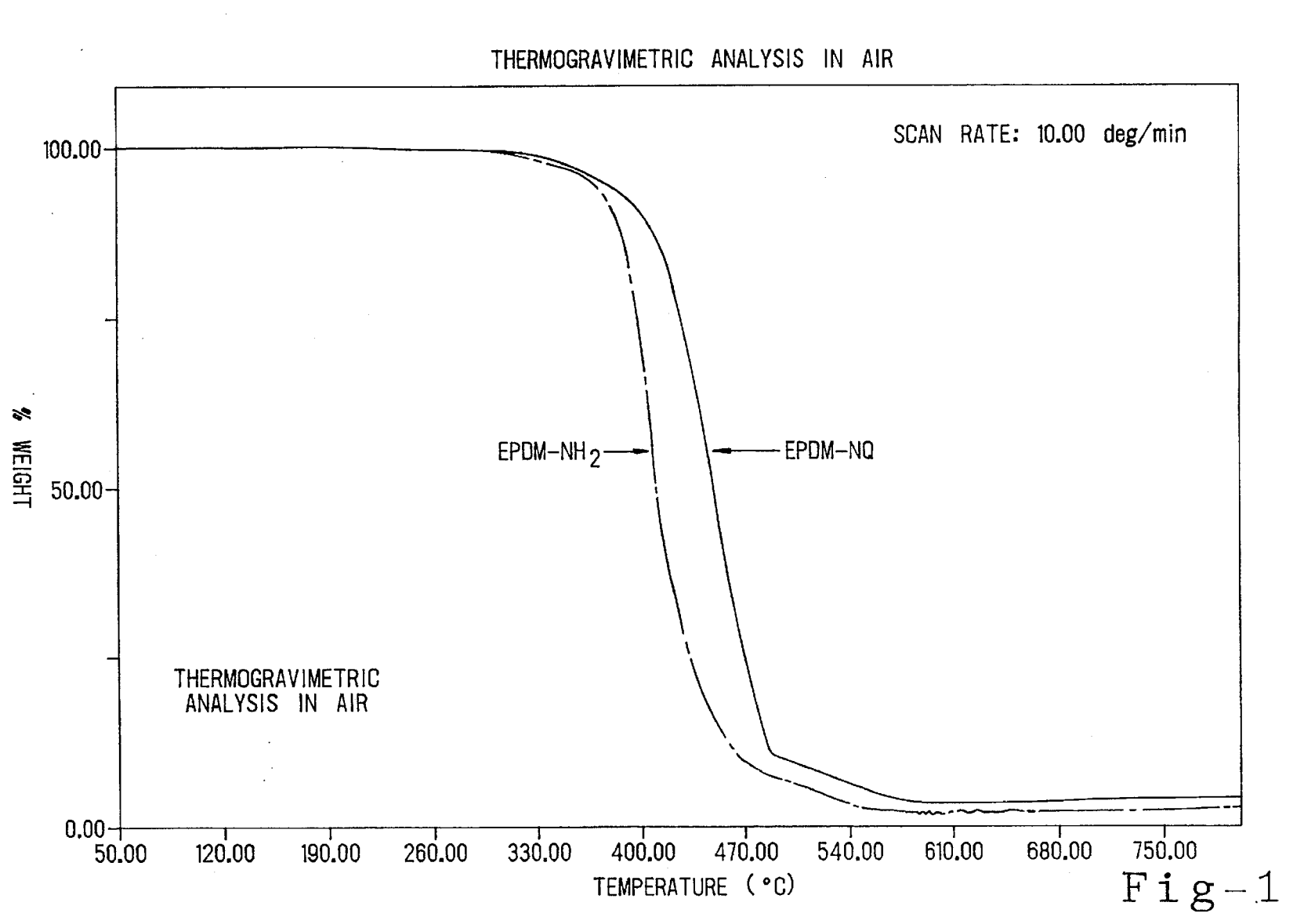

The Thermal Gravimetric Analysis (TGA) was used as a method for evaluation of thermooxidative stability (e.g., a measure of antioxidancy). The TGA analysis shown in FIG. 1 under air, of the naphthoquinone reacted EPDM-amine showed improved thermooxidative stability compared to EPDM-amine. This indicates that naphthoquinone helps in stabilizing the EPDM-amine. For example, the naphthoquinone adduct of EPDM-amine product is more stable than its precursor EPDM-NH$_2$ by about 37° C. at a weight of 50%.

What is claimed is:

1. A lubricating oil composition comprising base oil and an effective dispersant, antioxidant, and viscosity modifying amount of an oil soluble reaction product of at least one quinone compound and a polymer having at least one reactive amino group selected from the group consisting of primary and secondary amino groups, wherein said polymer has an $\overline{M}_n$ of from about 20,000 to about 500,000.

2. The composition of claim 1 wherein said polymer is an ethylene/C$_3$-C$_{25}$ alpha-olefin copolymer.

3. The composition of claim 2 wherein said polymer is a mixture of a first ethylene/propylene copolymer and a second ethylene/propylene copolymer, wherein said second copolymer differs from said first copolymer by at least 5 wt. % ethylene content.

4. The composition of claim 1 wherein said polymer is an ethylene/C$_3$-C$_{25}$ alpha-olefin terpolymer.

5. A lubricating oil composition comprising base oil and an effective dispersant, antioxidant, and viscosity modifying amount of an oil soluble reaction product of at least one quinone compound and the reaction product of a long chain hydrocarbyl substituted mono- or dicarboxylic acid or its anhydride, wherein said long chain hydrocarbyl has an $\overline{M}_n$ of from about 20,000 to about 500,000 and an amine containing at least 2 reactive amino groups selected from the group consisting of primary and secondary amino groups, wherein the reaction product contains at least one reactive amino group selected from the group consisting of primary and secondary amino groups.

6. The composition of claim 5 wherein said hydrocarbyl-substituted mono- or dicarboxylic acid or its anhydride is selected from the group consisting of maleic acid, fumaric acid, chloromaleic acid, acrylic acid, methacrylic acid, and crotonic acid.

7. A lubricating oil composition comprising base oil and an effective dispersant, and viscosity modifying amount of an oil soluble reaction product of at least one quinone compound and an amine-containing polymer having at least one reactive amine group selected from the group consisting of primary and secondary amines, wherein said polymer is formed by the process of polymerizing ethylene with an alpha-olefin and an organometallic compound masked nitrogen-containing monomer, followed by hydrolysis to remove the organometallic compound and wherein said polymer has an $\overline{M}_n$ of 20,000-500,000.

8. The reaction product of a polymer containing a reactive nitrogen and at least one quinone compound wherein said polymer has an $\overline{M}_n$ of 20,000-500,000 and wherein said polymer contains from about 20-90 wt. % ethylene and from about 80-10 wt. % propylene.

9. A lubricating oil of claim 8 wherein said quinone compound comprises benzoquinone or naphthoquinone.

10. A reaction product useful as a fuel or lubricant additive having chemical formula:

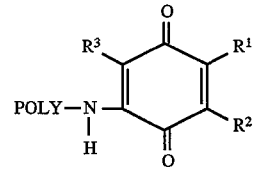

wherein POLY is a polymeric hydrocarbyl having an $\overline{M}_n$ of about 20,000–500,000, —NH— is derived from an amine containing at least two reactive nitrogens and wherein R$_1$, R$_2$, and R$_3$ are independently selected from hydrogen, halogen, hydrocarbyl, and substituted hydrocarbyl, or R$_1$ and R$_2$ are joined to from a hydrocarbocyclic ring or a substituted hydrocarbocyclic ring; or having the chemical formula:

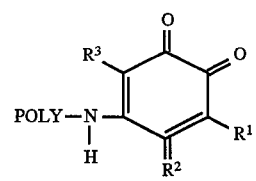

wherein POLY is a polymeric hydrocarbyl and having $\overline{M}_n$ of about 20,000–5000,000, —NH— is derived from an amine containing at least two reactive nitrogens and wherein R$_1$, R$_2$, and R$_3$ are independently selected from hydrogen, halogen, hydrocarbyl, and substituted hydrocarbyl, or R$_1$ and R$_2$ are joined to form a hydrocarbocyclic ring or a substituted hydrocarbocyclic ring.

11. An oil soluble reaction product, useful as an antioxidant-dispersant-viscosity modifier for lubricating oil, comprising the reaction product of at least one quinone compound and (a) an oil soluble ethylene copolymer comprising about 15–90 wt. % ethylene and about 10–85 wt. % of one or more C$_3$-C$_{28}$ alpha-olefin, having an $\overline{M}_n$ within a range of about 20,000–500,000 and grafted with an ethylenically unsaturated carboxylic acid material having 1 to 2 carboxylic acid groups or anhydride groups;

(b) an alkylene or oxyalkylene amine having at least two primary amine groups selected from the group consisting of (i) alkylene polyamines having alkylene groups of about 2 to 7 carbon atoms and 2 to 11 nitrogens, and, (ii) polyoxyalkylene polyamines wherein the alkylene groups contain 2 to 7 carbon atoms and about 3 to 7 oxyalkylene groups;

(c) a long chain hydrocarbyl substituted succinic anhydride or acid having 50 to 400 carbon atoms; and optionally, (d) a capping agent.

12. The reaction product of claim 11 inherein said alkylene amine comprises diethylene triamine.

* * * * *

UNITED STATES PATENT AND TRADEMARK OFFICE
CERTIFICATE OF CORRECTION

PATENT NO. : 5,639,718
DATED : June 17, 1997
INVENTOR(S) : Abhimanyu O. Patil

It is certified that error appears in the above-indentified patent and that said Letters Patent is hereby corrected as shown below:

Claim 10, col. 22, line 23, change the word "from" to --form--.

Claim 10, col. 22, line 36, change the number "5000,000" to --500,000--.

Claim 12, col. 22, change the word "inherein" to -wherein--.

Signed and Sealed this

Twenty-first Day of October 1997

Attest:

BRUCE LEHMAN

Attesting Officer

Commissioner of Patents and Trademarks